United States Patent
Andres et al.

(10) Patent No.: US 10,621,541 B2
(45) Date of Patent: Apr. 14, 2020

(54) STATOR HEAT TRANSFER FEATURE FOR A DYNAMOELECTRIC MACHINE

(71) Applicant: Hamilton Sundstrand Corporation, Charlotte, NC (US)

(72) Inventors: Michael J. Andres, Rockton, IL (US); Robert Scott Downing, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 147 days.

(21) Appl. No.: 15/899,073

(22) Filed: Feb. 19, 2018

(65) Prior Publication Data

US 2018/0174098 A1 Jun. 21, 2018
US 2019/0005448 A9 Jan. 3, 2019

Related U.S. Application Data

(63) Continuation of application No. 14/677,418, filed on Apr. 2, 2015, now abandoned.

(51) Int. Cl.
*H02K 1/20* (2006.01)
*G06Q 10/08* (2012.01)
(Continued)

(52) U.S. Cl.
CPC ......... *G06Q 10/0835* (2013.01); *G06Q 10/08* (2013.01); *H02K 5/18* (2013.01); *H02K 5/20* (2013.01); *H02K 9/19* (2013.01)

(58) Field of Classification Search
CPC .. H02K 1/20; H02K 5/20; H02K 9/02; H02K 9/08; H02K 9/10; H02K 9/19; H02K 9/193; H02K 9/197; H02K 9/22
(Continued)

(56) References Cited

U.S. PATENT DOCUMENTS

| 5,331,238 A | 7/1994 | Johnsen |
| 6,300,693 B1 | 10/2001 | Poag et al. |
| 6,836,409 B1 | 12/2004 | Duxbury et al. |

(Continued)

FOREIGN PATENT DOCUMENTS

| DE | 102007048683 A1 | 4/2008 |
| EP | 0899852 A1 | 3/1999 |

(Continued)

OTHER PUBLICATIONS

Machine translation of FR-2780571-A1. (Year: 1999).*
Extended European Search Report for Application No. 16163637.8 dated Aug. 5, 2016, 9 pages.

*Primary Examiner* — Michael Andrews
(74) *Attorney, Agent, or Firm* — Kinney & Lange, P.A.

(57) ABSTRACT

A dynamoelectric machine includes a shaft, a rotor radially outward from the shaft with the rotor and shaft arranged to rotate in unison, a stator radially outward from the rotor with the stator being stationary relative to the rotor and shaft, and a heat transfer feature adjacent to and radially outward from the stator. The heat transfer feature includes a base encasing the stator, the base having a first end, a second end, and an axial middle; a first set of fins extending radially outward from the base adjacent the first end and the second end; and a second set of fins extending radially outward from the axial middle of the base with the second set of fins each having a smaller surface area and being closer to one another than the first set of fins.

15 Claims, 9 Drawing Sheets

(51) Int. Cl.
*H02K 5/18* (2006.01)
*H02K 9/19* (2006.01)
*H02K 5/20* (2006.01)

(58) Field of Classification Search
USPC .................................. 310/52–59, 64, 89, 91
See application file for complete search history.

(56) References Cited

U.S. PATENT DOCUMENTS

| | | |
|---|---|---|
| 7,247,959 B2 | 7/2007 | Chan et al. |
| 7,439,646 B2 | 10/2008 | Birdi et al. |
| 7,808,149 B2 | 10/2010 | Pabst et al. |
| 8,525,375 B2 | 9/2013 | Pal |
| 9,507,391 B2 | 11/2016 | Busch et al. |
| 2006/0284511 A1 | 12/2006 | Evon et al. |
| 2008/0100159 A1 | 5/2008 | Dawsey et al. |
| 2008/0179972 A1* | 7/2008 | Aoki .................. H01L 21/4878 310/52 |
| 2010/0277016 A1 | 11/2010 | Dang et al. |
| 2011/0234029 A1* | 9/2011 | Pal .......................... H02K 1/20 310/54 |
| 2012/0080965 A1* | 4/2012 | Bradfield ................ H02K 1/20 310/58 |
| 2013/0062976 A1* | 3/2013 | Rai ........................ H02K 1/32 310/61 |
| 2013/0207502 A1 | 8/2013 | Yamada et al. |
| 2014/0241865 A1 | 8/2014 | Arimatsu |
| 2015/0048699 A1 | 2/2015 | Ribarov et al. |

FOREIGN PATENT DOCUMENTS

| | | | |
|---|---|---|---|
| EP | 1174988 A1 | 1/2002 | |
| EP | 2369723 A2 | 9/2011 | |
| FR | 2780571 A1 * | 12/1999 | ............... H02K 9/19 |
| FR | 2780571 A1 | 12/1999 | |
| WO | WO2014/057245 A2 | 4/2014 | |
| WO | WO2014/158939 A1 | 10/2014 | |

* cited by examiner

STATOR HEAT TRANSFER FEATURE FOR A DYNAMOELECTRIC MACHINE

CROSS-REFERENCE TO RELATED APPLICATION(S)

This application is a continuation of U.S. application Ser. No. 14/677,418 filed Apr. 2, 2015 for "Stator Heat Transfer Feature" by M. J. Andres and R. S. Downing.

BACKGROUND

The present disclosure relates to thermal management for a dynamoelectric machine and, more particularly, to a heat transfer feature on a stator.

Dynamoelectric machines, such as motors and generators, are commonly found in industrial, commercial, aerospace, and consumer settings. In industry, such machines are employed to drive various kinds of devices, including pumps, conveyors, compressors, fans, and others. In the case of electric motors and generators, these devices generally include a stator, which have a plurality of stator windings, surrounding a rotor.

During operation, the stator produces heat due to ohmic losses in the stator windings and hysteresis and eddy current losses in the stator. If left unabated, excess heat can reduce the efficiency of the machine and/or result in damage and failure. Therefore, it is important that the dynamoelectric machine has a more efficient thermal management system to increase heat transfer, thereby reducing temperatures, improving efficiency, and increasing durability.

SUMMARY

A dynamoelectric machine includes a shaft, a rotor radially outward from the shaft with the rotor and shaft arranged to rotate in unison, a stator radially outward from the rotor with the stator being stationary relative to the rotor and shaft, and a heat transfer feature adjacent to and radially outward from the stator. The heat transfer feature includes a base encasing the stator, the base having a first end, a second end, and an axial middle; a first set of fins extending radially outward from the base adjacent the first end and the second end; and a second set of fins extending radially outward from the axial middle of the base with the second set of fins each having a smaller surface area and being closer to one another than the first set of fins.

A stationary member in a dynamoelectric machine includes a stator having an annular back iron and a plurality of teeth extending radially inward from the back iron, a plurality of windings wrapped around each of the plurality of teeth, and a heat transfer feature on a radially outer side of the back iron. The heat transfer feature includes a base adjacent the back iron, fins extending radially outward from the base, and a channel formed by the fins with the channel extending at least partially in an axial direction and partially in a circumferential direction.

DETAILED DESCRIPTION

A heat transfer feature on a stator of a dynamoelectric machine is disclosed herein that includes a base to seal the stator, which may be comprised of a lamination stack, from a cooling fluid to prevent the cooling fluid from seeping through seams in the lamination stack of the stator and causing windage losses in an air gap between the rotor and the stator. The heat transfer feature also includes fins that extend radially outward from the base to help transfer heat from the stator to the cooling fluid passing adjacent to the heat transfer feature. The fins can be arranged so as to be optimized for specific application, such as minimal weight, maximum surface area increase, minimal fluid pressure drop, and/or maximum heat transfer. The arrangement of fins can create a channel between fins that causes the cooling fluid to flow in an axial direction, a circumferential direction, and a radial direction to improve the interaction between the heat transfer feature and the cooling fluid and result in a more efficient thermal management system.

Figure 1A:
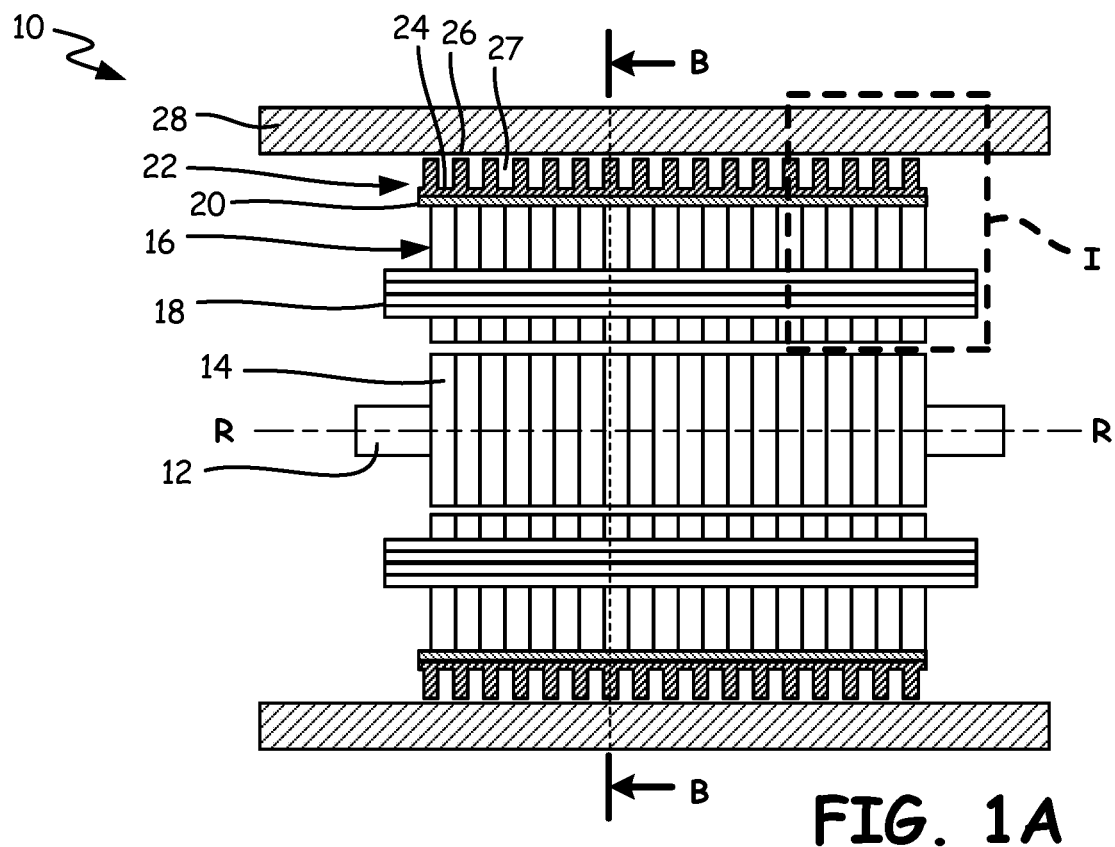
FIG. 1A is a cross-sectional view of a core portion of a dynamoelectric machine.
Figure 1B:
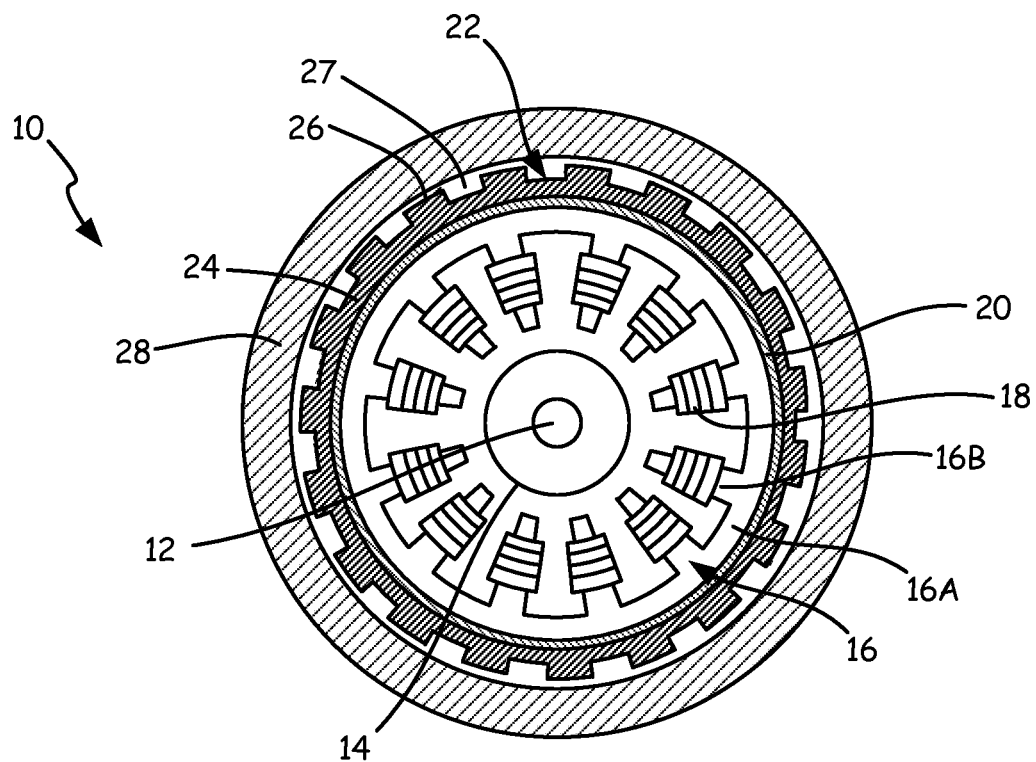
FIG. 1B is a cross-sectional view of the core portion of the dynamoelectric machine of FIG. 1A taken along section line B-B.
Figure 1C:
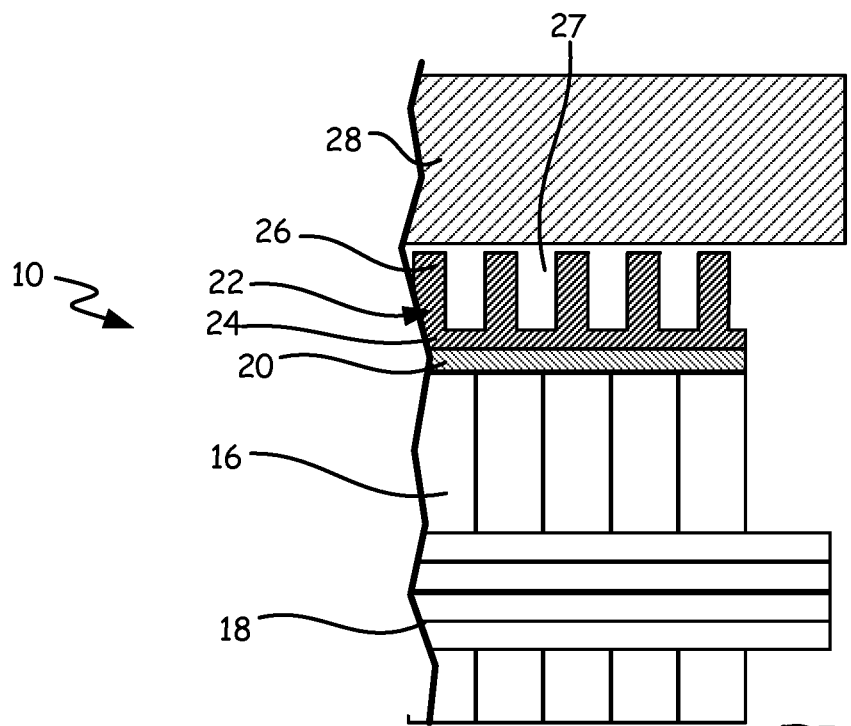
FIG. 1C is an enlarged cross-sectional view of a heat transfer feature of the dynamoelectric machine of FIG. 1A at section I.

FIG. 1A is a cross-sectional side view of a core portion of a dynamoelectric machine, FIG. 1B is a cross-sectional front view of the core portion of the dynamoelectric machine of FIG. 1A taken along section line B-B, and FIG. 1C is an enlarged cross-sectional side view of a heat transfer feature of the dynamoelectric machine of FIG. 1A at section I. Dynamoelectric machine 10 includes shaft 12, rotor 14, stator 16 (with back iron 16A and teeth 16B), stator windings 18, interface layer 20, heat transfer feature 22 (with base 24, fins 26, and channel 27), and housing 28.

Dynamoelectric machine 10 can be a motor or a generator that is able to drive (via mechanical or electrical output) various devices, including pumps, conveyors, compressors, fans, rollers, wheels, or other machines. Dynamoelectric machine 10 shown in FIGS. 1A, 1B, and 1C can be a generator or motor of any architecture that has a wound stator including a permanent magnet, synchronous, induction, and/or switched reluctance. Additionally, all components of dynamoelectric machine 10 are not shown, and dynamoelectric machine 10 can include other components, such as those particularly suited for the intended use of dynamoelectric machine 10.

Shaft 12 extends axially along axis of rotation R, which is at a radial center of dynamoelectric machine 10. Shaft 12 is a cylinder with a consistent or varying radius that can be solid, hollow, or multiple pieces fastened together, depending on design considerations. Shaft 12 can be made from a variety of materials, including steel, aluminum, or other materials able to handle high stresses without deformation and/or failure. When used as a motor, energy can be outputted from dynamoelectric machine 10 through the rotation of shaft 12, which would be used to drive exterior devices. Alternatively, when used as a generator, rotational energy can be inputted into dynamoelectric machine 10 by driving shaft 12 to rotate which, in turn, induces voltage in stator windings 18. The induced voltage can be outputted to supply electricity to exterior devices.

Rotor 14 is radially outward from and extends axially along axis of rotation R and shaft 12. Rotor 14 is fastened or incorporated into shaft 12 so that shaft 12 and rotor 14 rotate in unison. Rotor 14 can be a lamination stack, which is multiple cross-sectional pieces (called sheets) fastened together to create a final piece (called the stack) having the dimensions of rotor 14. The lamination stack of rotor 14 can be a variety of materials, such as steel or another material, and the sheets can be fastened together through adhesive, resin, or another means, such as welding. Rotor 14 can include multiple rotor windings, which are not shown in FIGS. 1A, 1B, and 1C. The rotor windings are wrapped around corresponding winding supports on rotor 14 and either induce voltage in stator windings 18 or, depending on the configuration of dynamoelectric machine 10, stator windings 18 induce voltage in the rotor windings due to the rotation of the rotor windings and rotor 14 within stator windings 18.

Stator 16 extends axially parallel to axis of rotation R and shaft 12 to be radially outward from rotor 14. Stator 16 is physically separate from rotor 14 so that a gap is present between an outermost surface of rotor 14 and an innermost surface of stator 16. Stator 16 is stationary relative to shaft 12 and rotor 14, and shaft 12 and rotor 14 rotate within stator 16 to either induce voltage in stator windings 18 or the rotor windings on rotor 14. Like rotor 14, stator 16 can be a lamination stack with sheets fastened together to create stator 16. The lamination stack of stator 16 can be a variety of materials, such as steel or another material, and the sheets can be fastened together through adhesive, resin, or another means, such as welding.

Stator 16 generally includes two structural components: back iron 16A and teeth 16B. Back iron 16A is a radially outermost component of stator 16 and has a cylindrical shape that extends axially parallel to axis of rotation R. Teeth 16B are multiple inward projections extending from the radially inner surface of back iron 16A towards rotor 14. Teeth 16B extend axially parallel to axis of rotation R along a radially inner surface of back iron 16A. While FIG. 1B shows stator 16 having twelve teeth 16B, stator 16 can have any number of teeth 16B, including two, four, six, eight, or ten teeth 16B. Back iron 16A and teeth 16B can be separate components fastened to one another (or the multiple teeth 16B fastened to back iron 16A) or can be one continuous and monolithic piece (or a lamination stack).

Stator windings 18 are wrapped around teeth 16B so that each stator winding 18 is wrapped around one corresponding tooth of teeth 16B. Stator windings 18 are each continuous wires that are electrically conductive and wrapped multiple times around teeth 16B. The wires of stator windings 18 can be arranged in a single layer on teeth 16B or can be multiple layers of wires. During operation of dynamoelectric machine 10 as a generator, stator windings 18 can either be energized with electricity to act as an electromagnet to induce voltage in rotor 14, which is outputted to exterior devices, or stator windings 18 can be energized by the rotation of the magnetic field from the electrically energized rotor 14 (which creates an electromagnet) or permanent magnets of rotor 14 so that the voltage induced in stator windings 18 is outputted to exterior devices.

The electric current in rotor 14 and stator 16 (including stator windings 18) can cause stator 16 to experience elevated temperatures due to ohmic losses in the rotor windings and stator windings 18 and hysteresis and eddy current losses in stator 16. The elevated temperature of stator 16 could cause a reduction in efficiency of dynamoelectric machine 10 and/or damage to stator 16. Therefore, it is important that dynamoelectric machine 10 is suited to remove the heat that can accumulate within stator 16.

Interface layer 20 has a cylindrical shape centered about axis of rotation R and is radially outward from and adjacent to back iron 16A of stator 16. Interface layer 20 circumferentially encases an outer surface of stator 16 to provide a fluid barrier between the lamination stack of stator 16 and the cooling fluid radially outward from interface layer 20. Interface layer 20 prevents the cooling fluid from entering the seams in the lamination stack of stator 16. If the cooling fluid enters the seams in the lamination stack of stator 16, the cooling fluid could seep through stator 16 into the gap between rotor 14 and stator 16, potentially causing damage and a reduction in efficiency of dynamoelectric machine 10. Interface layer 20 can be made from a variety of materials, including steel, stainless steel, aluminum, or tungsten. The material(s) of interface layer 20 should be selected to provide reduced electrical conductivity to minimize shorting between the laminations that can makeup stator 16 while providing thermal conductivity between stator 16 and heat transfer feature 22 to most efficiently allow heat to pass from stator 16 to heat transfer feature 22 (and then to the cooling fluid). Additionally, interface layer 20 can be configured to allow for thermal expansion/contraction differences between stator 16 and heat transfer feature 22 to ensure stator 16 and heat transfer feature 22 remain adjacent to one another (with interface layer 20 in between). Interface layer 20 can be fastened to stator 16 through various means, including adhesive, welding, or other fasteners. Interface layer 20 can also be formed through additive manufacturing, with interface layer 20 being fastened to stator 16 through metallurgical bonds as the material(s) of interface layer 20 is additively manufactured onto stator 16. Interface layer 20 can be one continuous and monolithic component extending across the entire axial length of stator 16 or a number of pieces fastened together. Additionally, other embodiments, such as FIG. 2 discussed below, can include dynamoelectric machine 10 without interface layer 20, with base 24 of heat transfer feature 22 designed to perform the functions of interface layer 20.

Heat transfer feature 22 includes base 24, fins 26, and channel 27. Heat transfer feature 22 is a centered about axis of rotation R and is adjacent to and radially outward from interface layer 20. Heat transfer feature 22 has a cylindrically-shaped inner component (base 24) and radially outward extending projections (fins 26) that form a groove or grooves (channel 27).

Base 24 of heat transfer feature 22 is the cylindrical component adjacent to interface layer 20, or stator 16 if interface layer 20 is not present. As mentioned above, base 24 can fluidically seal stator 16 from the cooling fluid to prevent the cooling fluid from seeping into the seams in the lamination stack of stator 16 and eventually entering the gap between rotor 14 and stator 16 to cause increased windage losses. Base 24 has a radially outer surface from which fins 26 extend. Base 24 can also assist fins 26 in transferring heat from stator 16 to the cooling fluid adjacent to heat transfer features 22 by providing additional surface area that is in contact with the cooling fluid.

Fins 26 of heat transfer feature 22 extend radially outward from base 24 into a gap between base 24 and housing 28 to create at least one channel 27. Fins 26 allow heat from stator 16 to be transferred to the cooling fluid adjacent heat transfer feature 22 by, among other features, providing an increased surface area to heat transfer feature 22. Additionally, the shape and configuration of fins 26 and channel 27 can be optimized for specific designs, such as reduced weight, minimal diameter increase, manipulation of the flow of the cooling fluid to reduce fluid pressure drop along heat transfer feature 22, and/or maximum heat transfer (fluid pressure drop and increased heat transfer are proportional to one another). Some different shapes and configurations of fins 26 and channel 27 will be discussed in greater detail with regards to FIGS. 2, 3, and 4A-4F. As seen most easily in FIG. 1C, fins 26 of heat transfer feature 22 on dynamoelectric machine 10 are rectangular cross-section radial projections (when viewed in front and side elevation views) spaced axially along base 24. Fins 26 can be arranged such that channel 27 formed by fins 26 extends only in a circumferential direction (as in FIG. 1C), extends only in an axial direction, or angles, waves, or zig-zags to extend both in the circumferential direction and the axial direction (as in FIGS. 4A-4F). Fins 26 can also have an airfoil/wing configuration optimized to reduce the pressure drop of the cooling fluid as the cooling fluid flows adjacent to heat transfer feature 22. The airfoil/wing configuration of fins 26 can have varied bow, twist, camber, lean, thickness, span, chord, and sweep that are optimized for specific designs.

As in FIGS. 1A, 1B, and 1C, fins 26 can have an axial length and a circumferential length that are substantially equal (an aspect ratio of axial length to circumferential length close to 1:1). However, as seen in other embodiments, fins 26 can extend across the entire axial length of base 24 (a very large aspect ratio of axial length to circumferential length) (as will be discussed in greater detail with regards to FIGS. 4B, 4D, and 4E), can extend across only a portion of the axial length of base 24 (a moderately large aspect ratio of axial length to circumferential length) (as will be discussed in greater detail with regards to FIGS. 4A, 4C, and 4F), or can be axially offset such that axially adjacent fins 26 are clocked relative to each other (i.e., angularly offset) and are parallel to circumferentially adjacent fins 26 (the aspect ratio of axial length to circumferential length depending on design considerations) (as will be discussed in greater detail with regards to FIG. 4C). Base 24 and fins 26 of heat transfer feature 22 can be one continuous and monolithic piece, or fins 26 can be individually fastened to base 24. Fins 26 can have varying lengths (axially and radially) and can extend radially outward entirely through the gap between base 24 and housing 28 to contact housing 28, or fins 26 can extend radially outward through only a portion of the gap between base 24 and housing 28.

Figure 4A:
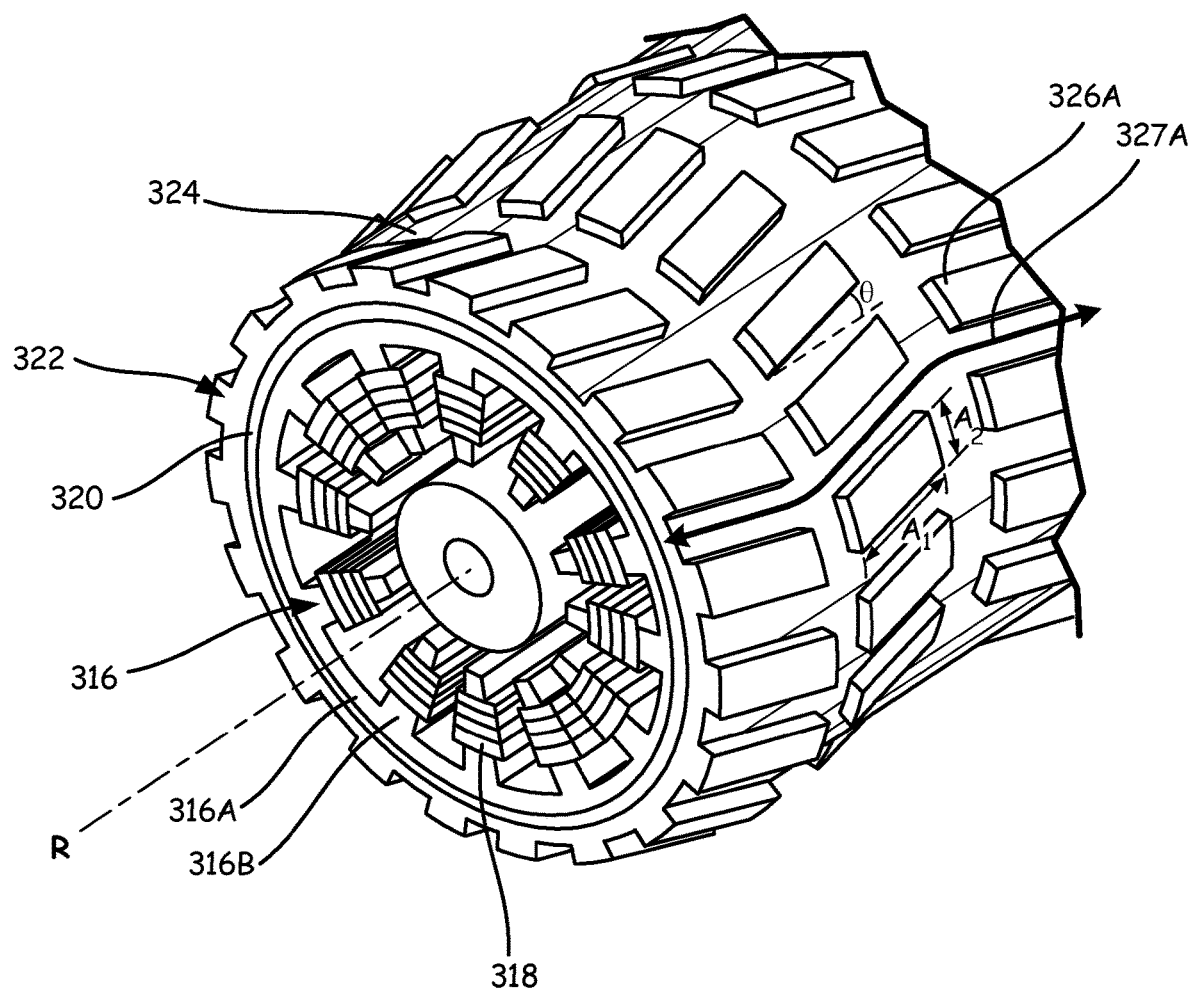
FIGS. 4A-4F are perspective views of a stator having other embodiments of the heat transfer feature.
Figure 4B:
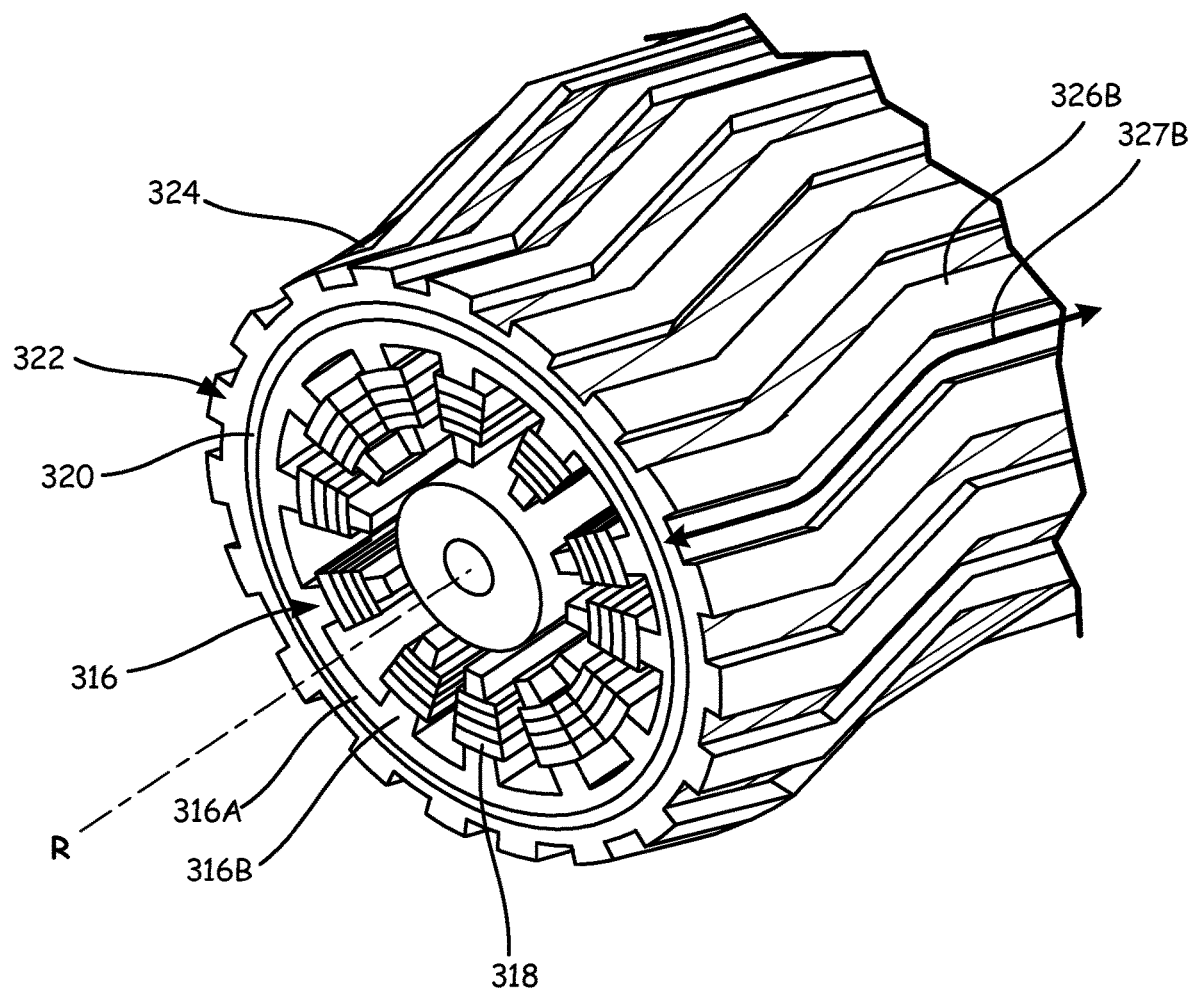
Figure 4C:
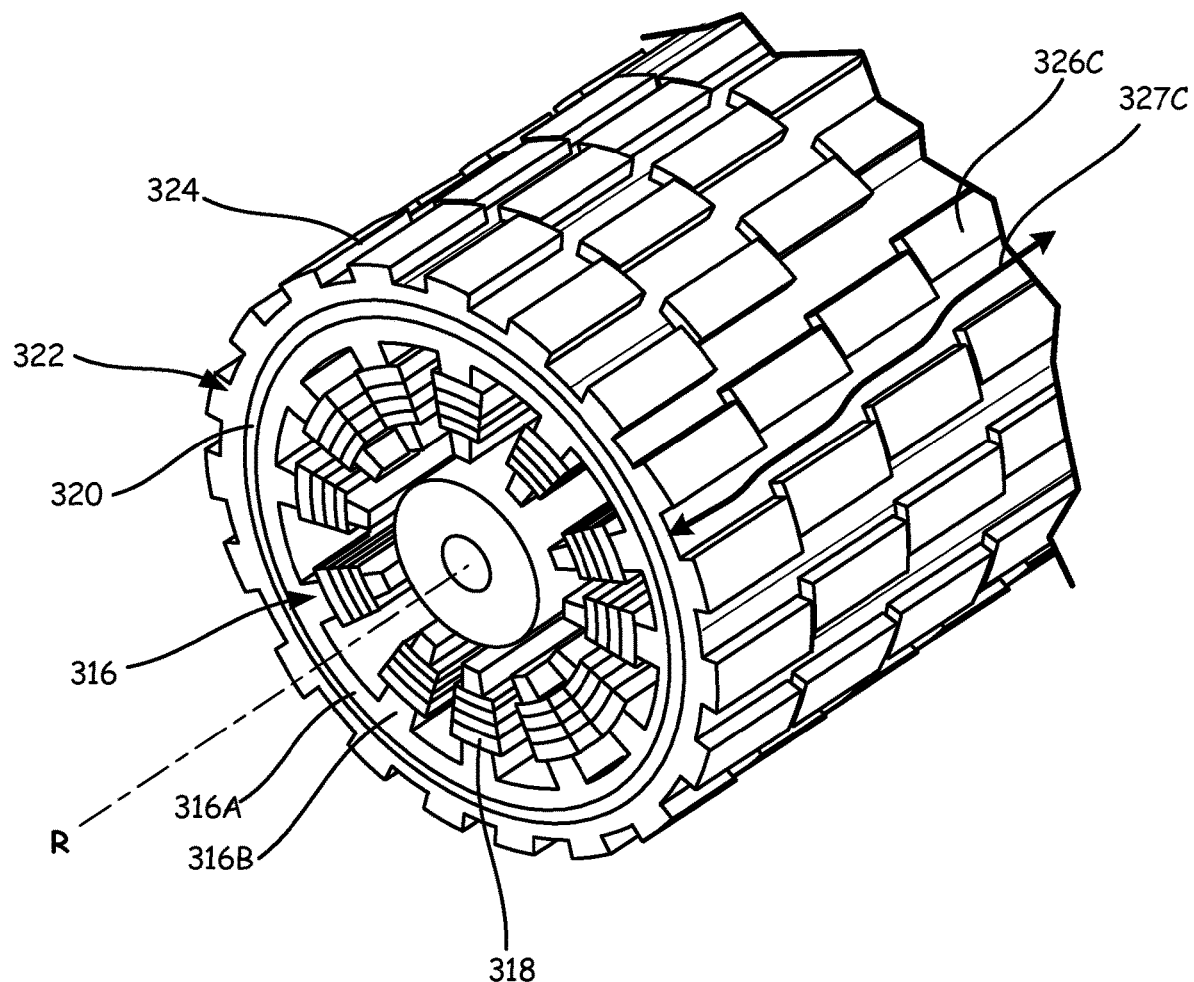
Figure 4D:
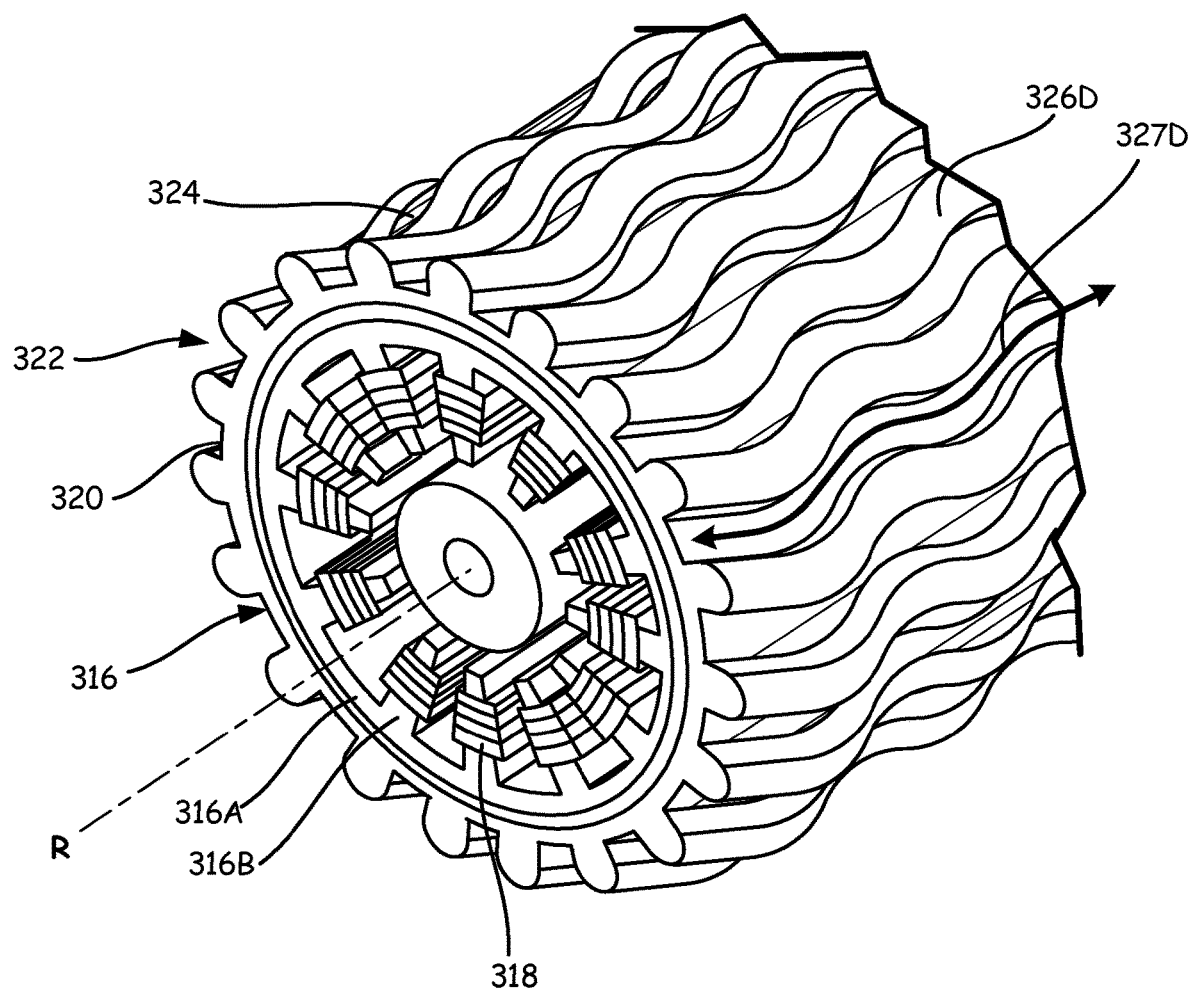
Figure 4E:
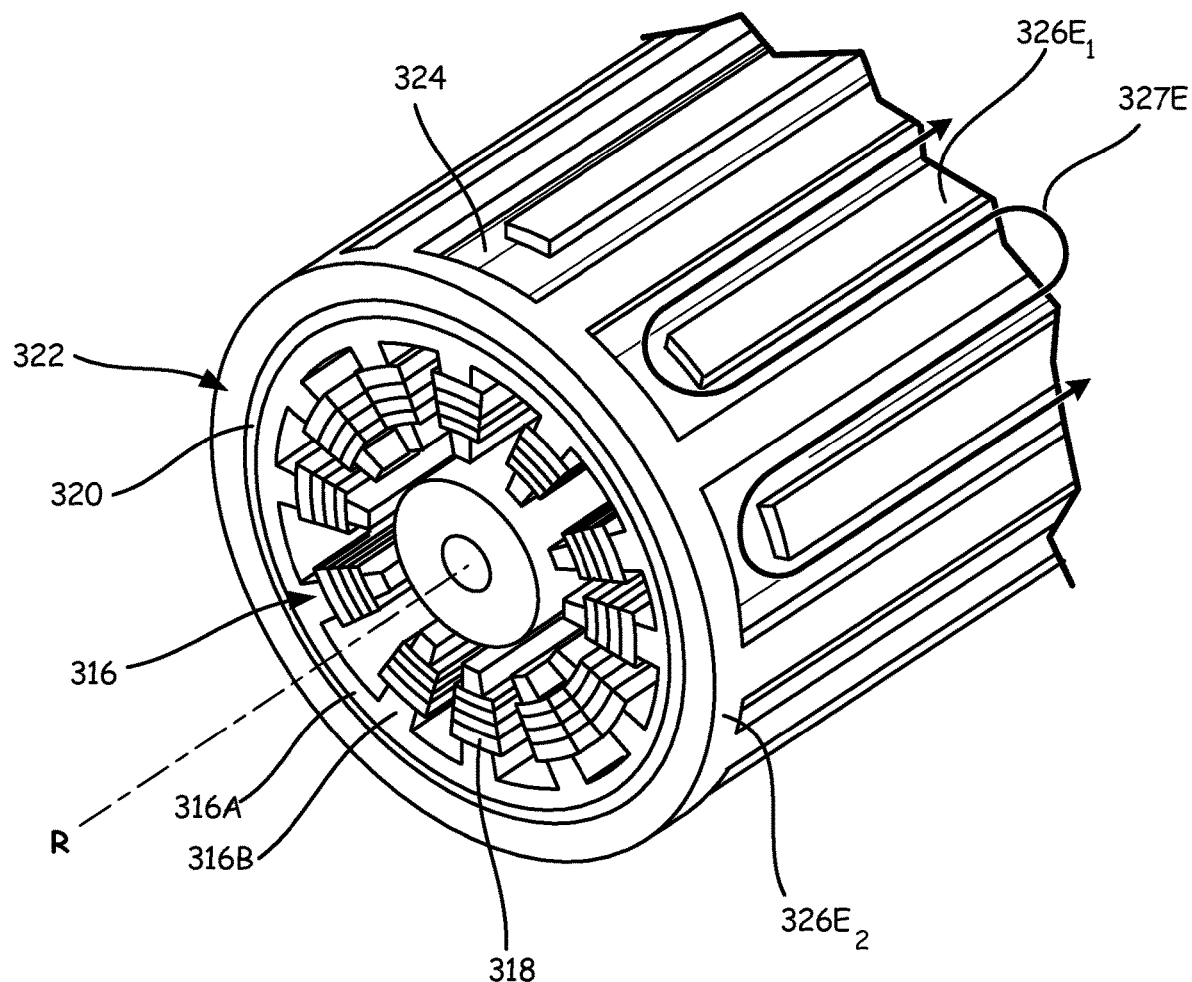
Figure 4F:
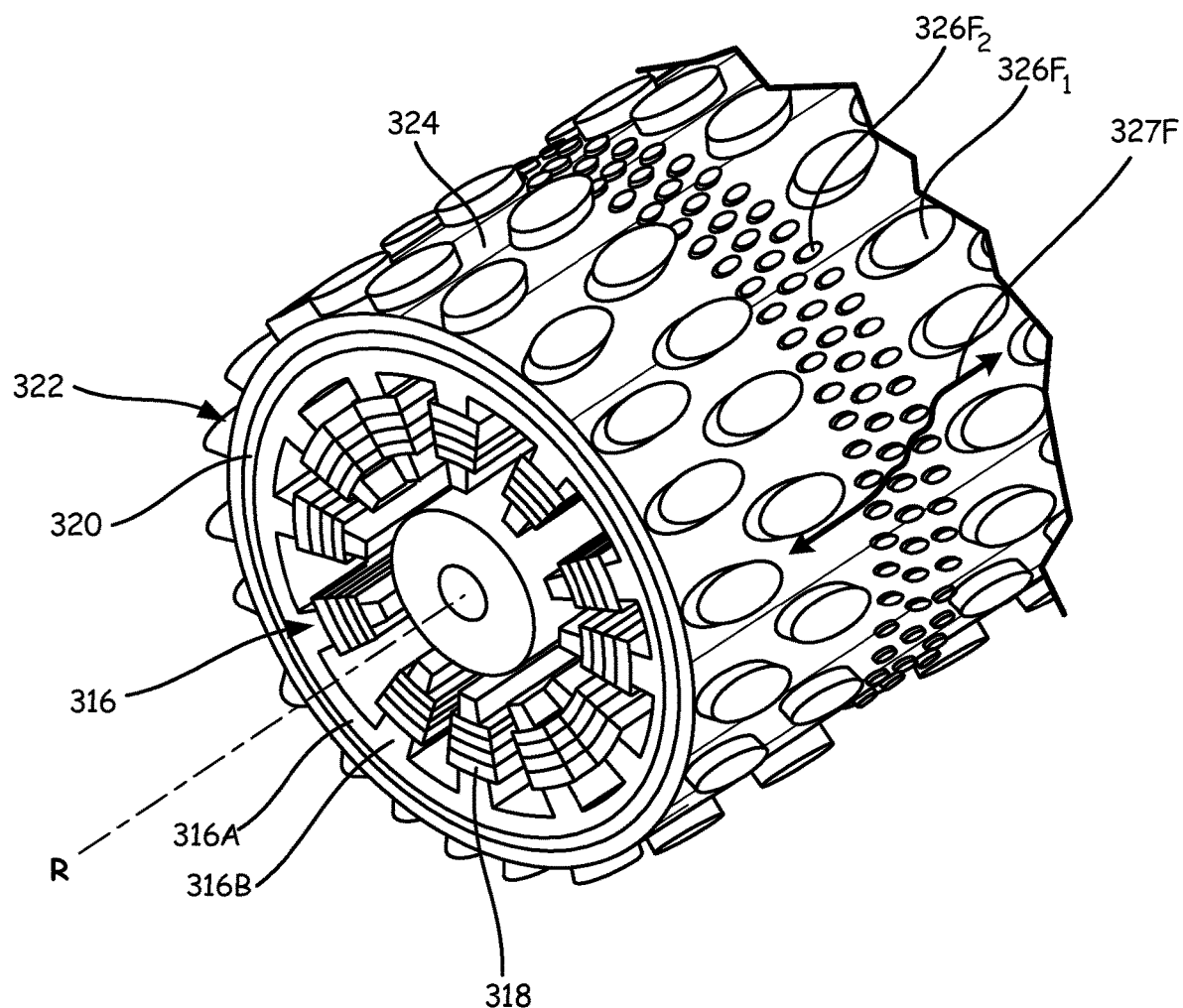

Channel 27 created by base 24 and fins 26 can be continuous so as to extend across the total length of base 24 with only two openings (one at each axial end), such as in FIGS. 4B and 4D, or channel 27 can have multiple openings that allow the flow of the cooling fluid to pass between adjacent channels 27, such as in FIGS. 4A, 4C, and 4F. Of course, the arrangement of channel 27 depends on the configuration of fins 26.

Heat transfer feature 22 can be made from a variety of materials, including copper, aluminum, steel, or other materials selected for desired properties, such as increased thermal conductivity, compatibility with the cooling fluid, a specific coefficient of thermal expansion, reduced weight, and/or resilience. Heat transfer feature 22 should be able to accept heat from stator 16 and transfer the heat to the cooling fluid adjacent heat transfer feature 22. Heat transfer feature 22 can also be adjacent to stator 16 if interface layer 20 is not present in dynamoelectric machine 10. If interface layer 20 is present, heat transfer feature 22 can also be configured to provide a fluid barrier between stator 16 and the cooling fluid adjacent heat transfer feature 22 while being flexible enough to handle the thermal expansion/contraction stresses of stator 16 and heat transfer feature 22. Heat transfer feature 22 can be fastened to interface layer 20, or stator 16 if interface layer 16 is not present, through various means, including adhesive, welding, or other fasteners. Heat transfer feature 22 can also be formed through additive manufacturing, with heat transfer feature 22 being fastened to interface layer 20 or stator 16 through metallurgical bonds as the material of heat transfer feature 22 is additively manufactured onto interface layer 20 or stator 16. Heat transfer feature 22 can be one continuous and monolithic component extending across an entire axial length of stator 16 or a number of pieces fastened together.

Housing 28 has a cylindrical shape centered about axis of rotation R and is radially outward from heat transfer feature 22. Housing 28 provides protection to dynamoelectric machine 10 to ensure the inner components (i.e., shaft 12, rotor 14, stator 16, stator windings 18, interface layer 20, and heat transfer feature 22) are not damaged during manufacturing, transportation, installation, and operation, as well as preventing unwanted particulate and/or fluid from entering dynamoelectric machine 10. Housing 28 can be made from a variety of materials, including steel, aluminum, plastic, or another material or combination of materials. However, the material(s) of housing 28 should be compatible with the cooling fluid adjacent to and in the gap between base 24 and housing 28. Housing 28 can be made from one continuous and monolithic piece or can be a number of pieces fastened together. As shown in other embodiments, housing 28 can include additional features, such as orifices to allow access to the inner components of dynamoelectric machine 10 or features that allow attachment of other components to housing 28.

As discussed above, heat transfer feature 22, with base 24 and fins 26 forming channel 27, receives heat from stator 16 and transfers the heat to the cooling fluid passing adjacent to heat transfer feature 22. Because stator 16 is a lamination stack, the cooling fluid may not be able to be adjacent to stator 16 (thus, the need to seal the outer surface of stator 16 using interface layer 20 and/or heat transfer feature 22), for the cooling fluid would seep between the sheets of the lamination stack and infiltrate stator 16 and rotor 14. The cooling fluid can be air, cooling lubricant, or another fluid suited to receive heat from heat transfer feature 22, but the cooling fluid should be compatible with the material(s) of heat transfer feature 22. Because the cooling fluid is fluidically separated from the interior components of dynamoelectric machine 10 by interface layer 20 and/or heat transfer feature 22, the cooling fluid need not be dielectric, so excellent coolants like water and glycol mixtures can be utilized. The cooling fluid can be continuously circulated or stationary adjacent heat transfer feature 22.

Figure 2:
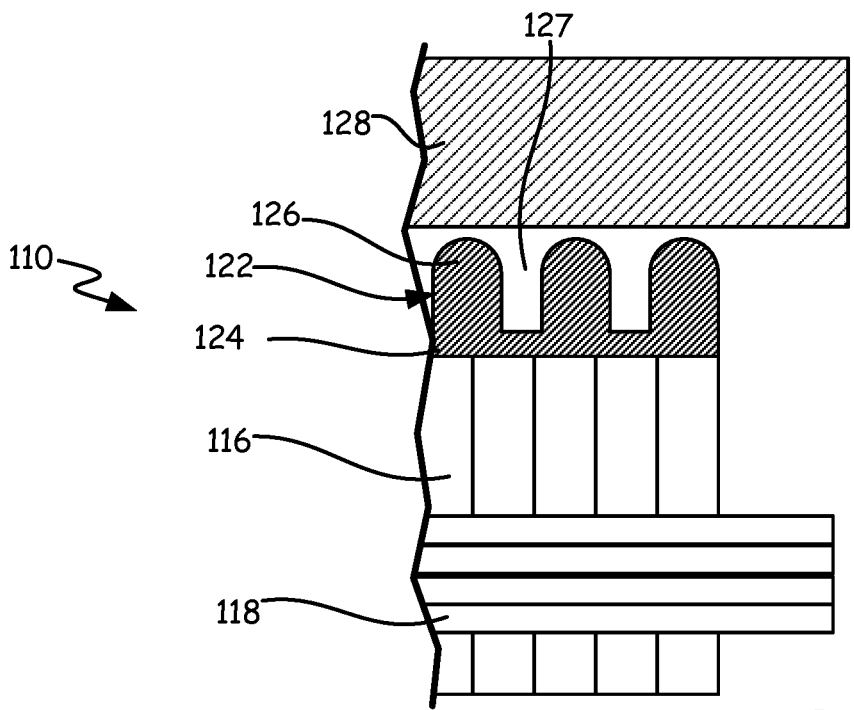
FIG. 2 is an enlarged cross-sectional view of an additional embodiment of a heat transfer feature.

FIG. 2 is an enlarged cross-sectional side view of an additional embodiment of a heat transfer feature. Dynamoelectric machine 110 includes (among other components) stator 116, stator windings 118, heat transfer feature 122 (with base 124, fins 126, and channel 127), and housing 128.

Dynamoelectric machine 110 is similar in configuration and function to dynamoelectric machine 10 of FIGS. 1A, 1B, and 1C, but dynamoelectric machine 110 does not include an interface layer between stator 116 and heat transfer feature 122 and includes a different configuration of fins 126 (and therefore a different configuration of channel 127).

An interface layer may be excluded from dynamoelectric machine 110 to increase the thermal conductivity between stator 116 and heat transfer feature 122, to reduce the diameter and/or weight of dynamoelectric machine 110, and/or to reduce the number of components, which can reduce manufacturing costs and time and increase durability. Because no interface layer is present, base 124 of heat transfer feature 122 should be configured to seal stator 116 from the cooling fluid adjacent heat transfer feature 122. Additionally, heat transfer feature 122 should be able to handle thermal expansion/contraction stresses between stator 116 and heat transfer feature 122 without becoming permanently deformed or compromising the sealing function of base 124. With no interface layer, heat transfer feature 122 can be fastened to stator 116 through various means, including being additively manufactured directly to stator 116.

Fins 126 of heat transfer feature 122 have a substantially semi-oval/arched cross-section (when viewed in the side elevation view). Fins 126 can extend circumferentially around the entire circumference of stator 116 and heat transfer feature 122 to form a completely circular channel 127 (a very small aspect ratio of axial length to circumferential length of each fin 126; i.e., substantially less than 1:1 or approaching 1:infinity), can extend only a portion of the circumference of heat transfer feature 122 (a moderately small aspect ratio of axial length to circumferential length of each fin 126), or multiple fins 126 can be evenly spaced circumferentially in line around the entire circumference of heat transfer feature 122 (a small, but not extremely small, aspect ratio of axial length to circumferential length of each fin 126). Similarly, fins 126 are shown in FIG. 2 as being evenly spaced axially, but can be unevenly spaced or offset such that circumferentially adjacent fins 126 are axially offset (forming channel 127 that extends both in the circumferential direction and the axial direction). Fins 126 have a rounded end, which can be designed to optimize the passage of the cooling fluid adjacent to heat transfer feature 122. The rounded ends of fins 126 form channel 127 that is wider at a radially outer location than at a location near base 124. As with heat transfer feature 22 of dynamoelectric machine 10, heat transfer feature 122 can be one continuous and monolithic piece, or fins 126 can be individually fastened to base 124. Fins 126 have varying lengths (axially and radially) and can extend radially outward entirely through a gap between base 124 and housing 128 to contact housing 128.

Figure 3:
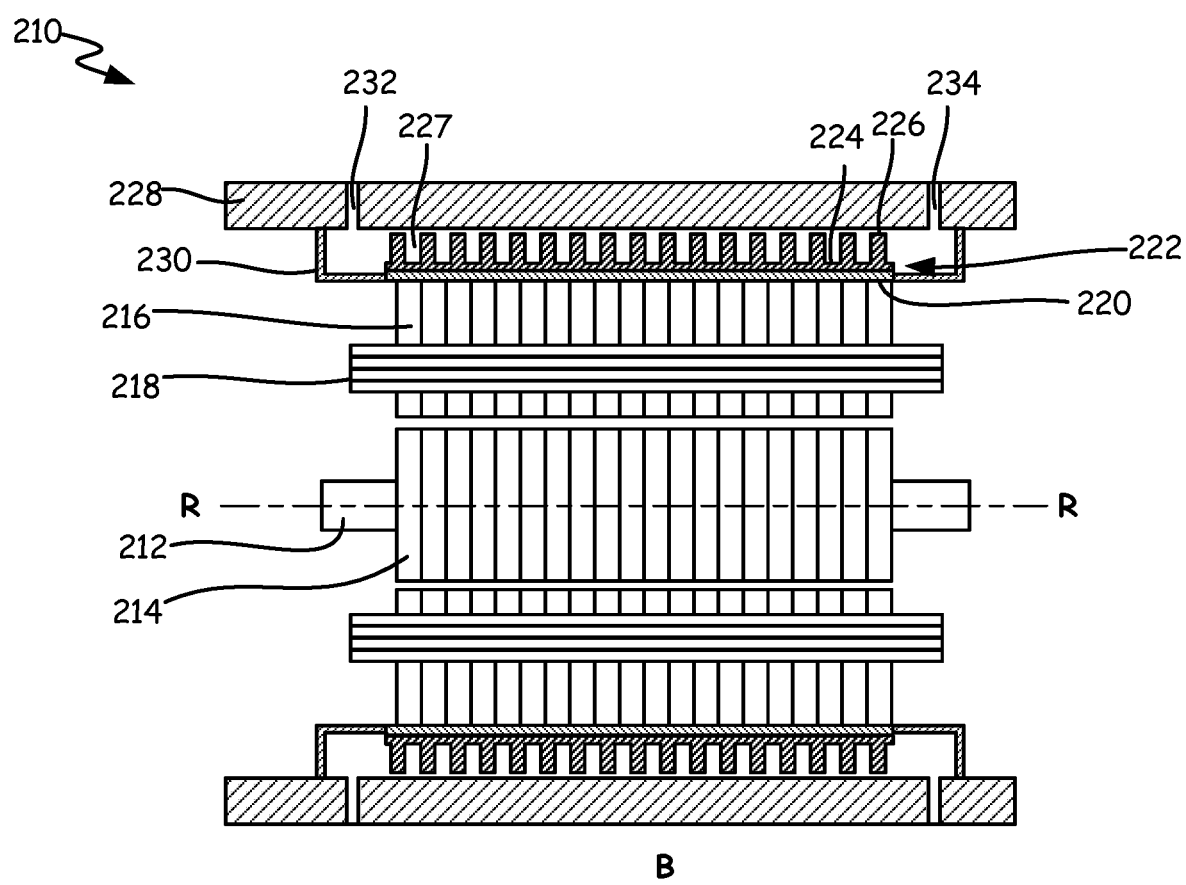
FIG. 3 is a cross-sectional view of another embodiment of a dynamoelectric machine.

FIG. 3 is a cross-sectional side view of another embodiment of a dynamoelectric machine. Dynamoelectric machine 210 includes shaft 212, rotor 214, stator 216, stator windings 218, interface layer 220, heat transfer feature 222 (with base 224, fins 226, and channel 227), housing 228 (with inlet 232 and outlet 234), and header 230.

Dynamoelectric machine 210 is similar in configuration and function to dynamoelectric machine 10 of FIGS. 1A, 1B, and 1C, but dynamoelectric machine 210 includes header 230 and inlet 232 and outlet 234 in housing 228.

Header 230 is a barrier between the cooling fluid adjacent to heat transfer feature 222 and housing 228 and the other components of dynamoelectric machine 210. Header 230 blocks the cooling fluid from contacting shaft 212, rotor 214, stator 216, and stator windings 218 to prevent the cooling fluid from entering the gaps between these components and causing damage, windage losses, and a reduction in efficiency. Header 230 can extend circumferentially around dynamoelectric machine 210 so as to be radially inward from housing 228 along the entire circumference of housing 228, or header 230 can extend around only a portion of housing 228 so that a cooling fluid is adjacent only a portion of heat transfer feature 222 and housing 228 with another portion of heat transfer feature 222 being adjacent to a cooling air/gas or no cooling fluid at all. Additionally, header 230 can extend along the entire axial length of heat transfer feature 222, stator 216, and/or housing 228 or can extend only along an axial portion of heat transfer feature 222, stator 216, and/or housing 228. Header 230 can be made from a variety of materials, including a flexible membrane or a rigid material, such as aluminum. However, the material(s) of header 230 should be suited to fluidically separate the cooling liquid from the other components of dynamoelectric machine 210 while also allowing for a fluid-tight seal between header 30 and the adjacent components (stator 216, interface layer 220, heat transfer feature 222, and/or housing 228). Header 230 can be fastened to stator 216 (on axial forward and aft sides), interface layer 220, and/or heat transfer feature 222 on a radially inner side and housing 228 on a radially outer side by various means, including adhesive, welding, or other fasteners, as well as additive manufacturing header 230 directly to dynamoelectric machine 210. As mentioned above, header 230 ensures that the cooling fluid, such as a cooling lubricant, stays fluidically separate from shaft 212, rotor 214, portions of stator 216, and stator windings 218 to prevent windage losses and other complications, such as damage due to seepage and/or a reduction in efficiency.

Inlet 232 and outlet 234 in housing 228 allow for the cooling fluid to enter and exit the gap between heat transfer feature 222 and housing 228 (and the multiple channels 227). Inlet 232 and outlet 234 can each be one orifice or multiple orifices arranged circumferentially around housing 228, depending on the design and the cooling fluid flow needs of dynamoelectric machine 210. While FIG. 3 shows inlet 232 on one axial end and outlet 234 on another axial end of housing 228, inlet 232 and outlet 234 can be located anywhere axially or circumferentially along housing 228 or not in housing 228 at all, instead extending through header 230 on axial forward and/or aft sides. Inlet 232 and outlet 234 can include other features, such as check valves and sensors, to monitor and regulate the flow of the cooling fluid into the gap formed by heat transfer feature 222, housing 228, and/or header 230. Additionally, inlet 232 and outlet 234 can be present in housing 228 even if dynamoelectric machine 210 does not include header 230.

FIGS. 4A-4F are perspective views of a stator having other embodiments of the heat transfer feature. FIGS. 4A-4F include stator 316 (having back iron 316A and teeth 316B), stator windings 318, interface layer 320, heat transfer feature 322 (having base 324 and a number of configurations of fins 326A-326F forming channel 327A-327F). Additionally, FIG. 4A shows major axis $A_1$, minor axis $A_2$, and angle θ to help explain the orientation of fins 326A. The components of FIGS. 4A-4F are similar to the components of dynamoelectric machine 10 of FIGS. 1A-1C.

Fins 326A of FIG. 4A extend radially outward from base 324 and angle across base 324 at angle θ, which is measure from a line parallel to axis of rotation R, to have both an axial element along major axis $A_1$ and a circumferential element along minor axis $A_2$. While fins 326A are shown to have a rectangular radially outer portion (such as in FIGS. 1A-1C), fins 326A can have other dimensions, such as a rounded radially outer portion (such as in FIG. 2). Additionally, fins 326A angle across base 324 such that each fin 326A is straight and parallel to circumferentially adjacent fins 326A, but fins 326A can have a curved or wavy configuration as fins 326A extend axially along base 324. As seen in FIG. 4A, fins 326A can extend axially for only a portion of the axial length of base 324 (a length of fins 326A along major axis $A_1$ is less than a total axial length of base 324), with fins 326A configured in series with alternating fins 326A having a different angle θ. Fins 326A can be configured such that each have an axial length that is one-tenth or less of the axial length of base 324. The configuration of fins 326A create channel 327A that waves or zig-zags axially along base 324, with multiple openings that allow the cooling fluid to pass between adjacent channels 327A.

Fins 326B of FIG. 4B extend radially outward from base 324 and zig-zag across base 324 as fins 326B extend axially along base 324. Unlike fins 326A in FIG. 4A, fins 326B are continuous along the entire axial length of base 324 to form channel 327B that is continuous with openings only at each end. Like other embodiments, fins 326B can have a rounded radially outer portion in further embodiments instead of the rectangular radially outer portion shown in FIG. 4B. Circumferentially adjacent fins 326B extend parallel to one another (while still zig-zagging) to form a channel therebetween, but adjacent fins 326B can have other configurations, such as adjacent fins 326B zig-zagging in opposite circumferential directions as fins 326B extend axially along base 324 (making channel 327B have a varying circumferential width).

Fins 326C of FIG. 4C extend radially outward from base 324 with each fin 326C extending for only a portion of the axial length of base 324. Axially adjacent fins 326C are in stages, with each stage being clocked relative to each other (i.e., angularly offset) so that axially adjacent fins 326C are circumferentially offset. The offset can be great so that axially adjacent fins 326C are not in contact or the offset can be smaller so that a portion of one end of one fin 326C is in contact with a portion of one end of an adjacent fin 326C. The configuration of fins 326C with stages that are clocked to form fins 326C that are circumferentially offset can create channels 327C that are complex and have multiple openings that allow for the cooling fluid to pass between adjacent channels 327C. Channel 327C can have a stair-stepping configuration that extends axially for a length, then extends circumferentially for a length, then extends axially for a length again, and so on. Like other embodiments, fins 326C can have a rounded radially outer portion instead of the rectangular radially outer portion shown in FIG. 4C.

Fins 326D of FIG. 4D extend radially outward from base 324 and have a wavy, continuous configuration across base 324 as fins 326B extend axially along base 324. Fins 326B have a rounded radially outer portion but, like other embodiments, can instead have a rectangular radially outer portion. Circumferentially adjacent fins 326B wave/curve in unison with relation to one another (i.e., adjacent fins 326B curve at a same axial position along base 324) to form channel 327D therebetween, but adjacent fins 326B can have other configurations, such as adjacent fins 326B that wave or curve in opposite circumferential directions as fins 326B extend axially along base 324 (so that channel 327D has a varying circumferential width).

Fins 326E$_1$ and 326E$_2$ of FIG. 4E extend radially outward from base 324 and create serpentine channel 327E that extends predominately in the axial direction. Fins 326E$_1$ are continuous along an axial length of base 324 that is less than a total axial length of base 324, while fins 326E$_2$ are along a circumferential length at each end of base 324. Circumferentially extending fins 326E$_2$ are connected to alternate axially extending fins 326E$_1$ to form channel 327E that weaves axially between each end of base 324 (serpentine channel 327E has a "switchback" near each end of base 324). The configuration of fins 326E$_1$ and 326E$_2$ forms serpentine channel 327E that extends substantially along the axial length of base 324, reverses direction, and returns along the axial length of base 324. Circumferentially extending fins 326E$_2$ can be continuous to form an annular ring, or can have breaks/gaps to allow the cooling fluid to enter serpentine channel 327E between adjacent fins 326E$_1$, depending on design considerations and the heat transfer needs Like other embodiments, fins 326E$_1$ and 326E$_2$ can have a rounded radially outer portion in further embodiments instead of the rectangular radially outer portion shown in FIG. 4E. Additionally, axially extending fins 326E$_1$ do not need to extend purely in the axial direction and can angle or zig-zag, and axially extending fins 326E$_1$ do not need to extend parallel to one another, but rather can form channel 327E having a varying circumferential width.

Fins 326F$_1$ and 326F$_2$ of FIG. 4F extend radially outward from base 324 and create channel 327F that extends predominately in the axial direction. Fins 326F$_1$ and 326F$_2$ are oval protrusions, with fins 326F$_1$ being larger and located near the axial ends of base 324 and fins 326F$_2$ being smaller and located near the axial middle of base 324. The configuration of fins 326F$_1$ and 326F$_2$ can optimize heat transfer by location, with outer fins 326F$_1$ being larger but farther from one another at the ends of base 324 and inner fins 326F$_2$ being smaller but closer to one another near the middle of base 324. Fins 326F$_1$ will have smaller heat transfer properties than fins 326F$_2$ (because of a decrease in total surface area), but will result in a smaller pressure drop to the cooling fluid flowing through channel 327F at the ends of base 324 due to fewer disturbances to the cooling fluid because fins 326F$_1$ are more spaced apart. Inversely, fins 326F$_2$ will have larger heat transfer properties (because of an increase in total surface area), but will result in a larger pressure drop to cooling fluid flowing through channel 327F at the middle of base 324 due to more disturbances to the cooling fluid because fins 326F$_2$ more closely spaced. With the portion of stator 316 near the middle having the highest temperature due to heat flow out the ends of stator 316, such a configuration (with larger fins 326F$_1$ at the ends and smaller fins 326F$_2$ at the middle) can be desirable to increase heat transfer while also reducing pressure drop. Fins 326F$_1$ and 326F$_2$ can have other configurations of differing sizes, such as configurations in which fins 326F$_1$ and 326F$_2$ have axial and/or circumferential rows that alternate in fin size or configurations in which larger fins 326F$_1$ are surrounded by smaller fins 326F$_2$. While FIG. 4F shows fins 326F$_1$ and 326F$_2$ as oval shaped, fins 326F$_1$ and 326F$_2$ can have a variety of shapes Like other embodiments, fins 326F$_1$ and 326F$_2$ can have a rounded radially outer portion in further embodiments instead of the planar radially outer portion shown in FIG. 4F. Additionally, fins 326F$_1$ and 326F$_2$ do not need to have an elongated length that is substantially axial, but rather can have an elongated length that is substantially circumferential or is angled to have both axial and circumferential elements (similar to fins 326A in FIG. 4A).

As described above, the heat transfer feature and/or the interface layer can prevent the cooling fluid from seeping through the seams in the lamination stack of the stator and causing windage losses near a rotor. The heat transfer feature includes fins that extend radially outward from the base to help transfer heat from the stator to the cooling fluid passing adjacent to the heat transfer feature. The fins can be arranged so as to be optimized for specific application, such as minimal weight, maximum surface area increase, minimal fluid pressure drop, and/or maximum heat transfer. The arrangement of fins form at least one channel between the fins that aids in improving the interaction between the heat transfer feature and the cooling fluid and results in a more efficient thermal management system.

DISCUSSION OF POSSIBLE EMBODIMENTS

The following are non-exclusive descriptions of possible embodiments of the present invention.

A dynamoelectric machine includes a shaft, a rotor radially outward from the shaft with the rotor and shaft arranged to rotate in unison, a stator radially outward from the rotor with the stator being stationary relative to the rotor and shaft, and a heat transfer feature adjacent to and radially outward from the stator. The heat transfer feature includes a base encasing the stator and fins extending radially outward from the base with a configuration selected from a group consisting of i) the fins extend along an axial length that is less than a total axial length of the base or ii) the fins extend at least partially in a circumferential direction.

The dynamoelectric machine of the preceding paragraph can optionally include, additionally and/or alternatively, any one or more of the following features, configurations and/or additional components:

A housing radially outward from the heat transfer feature.

A fluid inlet in the housing that allows a fluid to enter a gap between the heat transfer feature and the housing and a fluid outlet in the housing that allows the fluid to exit the gap.

A header that fluidically isolates the heat transfer feature and the housing from the shaft, the rotor, and the stator.

An interface layer between the stator and the heat transfer feature, the interface layer fluidically separating the stator from the heat transfer feature.

The stator is a lamination stack.

A cooling lubricant adjacent to the heat transfer feature.

The heat transfer feature fluidically isolates the stator from the cooling lubricant.

Each fin extends axially along the base for one-tenth or less of a total axial length of the base.

Each fin extends axially along the base in a wavy pattern.

A stationary member in a dynamoelectric machine includes a stator having an annular back iron and a plurality of teeth extending radially inward from the back iron, a plurality of windings wrapped around each of the plurality of teeth, and a heat transfer feature on a radially outer side of the back iron. The heat transfer feature includes a base adjacent the back iron, fins extending radially outward from the base, and a channel formed by the fins with the channel extending at least partially in an axial direction and partially in a circumferential direction.

The stationary member of the preceding paragraph can optionally include, additionally and/or alternatively, any one or more of the following features, configurations and/or additional components:

At least one fin has a different amount of surface area than another fin.

Axially adjacent fins are clocked in the axial direction to be circumferentially offset.

Circumferentially adjacent fins extend parallel to one another at an angle at least partially in the axial direction and at least partially in the circumferential direction.

Each fin extends axially along the base in a wavy pattern.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For instance, features of an embodiment described above can optionally be used with features of any other embodiment, as desired for particular applications.

The invention claimed is:

1. A dynamoelectric machine comprising:
    a shaft extending along an axis;
    a rotor radially outward from and coupled to the shaft, the rotor and shaft arranged to rotate in unison about the axis;
    a stator radially outward from the rotor, the stator being rotationally uncoupled from the shaft and rotor and disposed to remain stationary relative to the rotor and shaft; and
    a heat transfer feature adjacent to and radially outward from the stator, the heat transfer feature comprising:
        a base encasing the stator, the base extending axially from a first end to a second end and having an axial middle disposed therebetween;
        a first set of fins extending radially outward from the base adjacent the first end and the second end; and
        a second set of fins extending radially outward from the axial middle of the base with the second set of fins each having a smaller surface area and being closer to one another than the first set of fins;
        wherein axially adjacent fins of the second set of fins are circumferentially offset.

2. The dynamoelectric machine of claim 1, wherein the first set of fins includes at least two axial rows of fins adjacent the first end and two axial rows of fins adjacent the second end.

3. The dynamoelectric machine of claim 1, further comprising:
    a housing radially outward from the heat transfer feature.

4. The dynamoelectric machine of claim 3, further comprising:
    a fluid inlet in the housing that allows a fluid to enter a gap between the heat transfer feature and the housing; and
    a fluid outlet in the housing that allows the fluid to exit the gap.

5. The dynamoelectric machine of claim 1, further comprising:
    a header that fluidically isolates the heat transfer feature and the housing from the shaft, the rotor, and the stator.

6. The dynamoelectric machine of claim 1, further comprising:
    an interface layer between the stator and the heat transfer feature, the interface layer fluidically separating the stator from the heat transfer feature.

7. The dynamoelectric machine of claim 1, wherein the stator is a lamination stack.

8. The dynamoelectric machine of claim 1, further comprising:
    a cooling lubricant adjacent to the heat transfer feature.

9. The dynamoelectric machine of claim 8, wherein the heat transfer feature fluidically isolates the stator from the cooling lubricant.

10. The dynamoelectric machine of claim 1, wherein each of the second set of fins extends axially along the base for one-tenth or less of a total axial length of the base.

11. The dynamoelectric machine of claim 1, wherein the second set of fins include at least three axial rows of fins.

12. The dynamoelectric machine of claim 1, wherein the first set of fins extends radially outward a greater distance than the second set of fins.

13. The dynamoelectric machine of claim 1, wherein the first set of fins and the second set of fins are each oval shaped when viewed in a radial direction.

14. The dynamoelectric machine of claim 13, wherein the oval shape of the first set of fins and the second set of fins is elongated in a substantially axial direction.

15. The dynamoelectric machine of claim 1, wherein axially adjacent fins of the first set of fins are circumferentially offset.

* * * * *